US009863474B2

(12) United States Patent
Katsaros et al.

(10) Patent No.: US 9,863,474 B2
(45) Date of Patent: Jan. 9, 2018

(54) BEARING ASSEMBLY WITH PRELOAD

(71) Applicants: Padelis Katsaros, Schweinfurt (DE); Volker Wendt, Uechtelhausen/Zell (DE)

(72) Inventors: Padelis Katsaros, Schweinfurt (DE); Volker Wendt, Uechtelhausen/Zell (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/297,805

(22) Filed: Oct. 19, 2016

(65) Prior Publication Data
US 2017/0114832 A1  Apr. 27, 2017

(30) Foreign Application Priority Data

Oct. 27, 2015 (DE) .................. 10 2015 220 962

(51) Int. Cl.
F16C 33/78  (2006.01)
F16C 19/36  (2006.01)
(Continued)

(52) U.S. Cl.
CPC ........ *F16C 33/7823* (2013.01); *B60B 27/001* (2013.01); *F16C 19/364* (2013.01);
(Continued)

(58) Field of Classification Search
CPC .. F16C 19/364; F16C 19/547; F16C 33/7813; F16C 33/7823; F16C 33/7886;
(Continued)

(56) References Cited

U.S. PATENT DOCUMENTS 2,802,351 A * 8/1957 Anderson ................ F16D 3/41
464/128
3,200,615 A * 8/1965 Stokely ................ F16C 21/005
277/353
(Continued)

FOREIGN PATENT DOCUMENTS

DE   102014208422      * 11/2015 ............ F16C 33/783
DE   102014208422 A1  * 11/2015 ............ F16C 33/783
WO   WO 2006118946 A1 * 11/2006 ............ F16C 19/522

Primary Examiner — Marcus Charles
(74) Attorney, Agent, or Firm — Bryan Peckjian; SKF USA Inc. Patent Dept.

(57) ABSTRACT

A wheel bearing assembly for a vehicle includes at least one rolling-element bearing having a first bearing ring and a second bearing ring defining therebetween a bearing interior, rolling elements disposed in the interior, and a seal assembly for sealing the bearing assembly. The seal assembly includes a sleeve-shaped element connected to the second bearing ring such that the sleeve-shaped element rotates with the second bearing, and the sleeve-shaped element includes a flange that forms an axial stop for the rolling elements. A carrier element is connected to the first bearing ring such the carrier element rotates with the first bearing ring, and the carrier element includes a radially extending annular flange. The radially extending annular flange supports a radially encircling seal having at least one seal lip, and the seal lip extends toward the second bearing ring and sealingly abuts on the sleeve shaped element.

20 Claims, 2 Drawing Sheets

(51) Int. Cl.
*B60B 27/00* (2006.01)
*F16C 19/54* (2006.01)
*F16C 43/04* (2006.01)
*F16C 19/38* (2006.01)
*F16C 25/08* (2006.01)
*F16C 33/58* (2006.01)

(52) U.S. Cl.
CPC .......... *F16C 19/386* (2013.01); *F16C 19/547* (2013.01); *F16C 25/083* (2013.01); *F16C 33/581* (2013.01); *F16C 33/7813* (2013.01); *F16C 33/7886* (2013.01); *F16C 43/045* (2013.01); *B60B 2380/14* (2013.01); *B60B 2380/75* (2013.01); *F16C 2223/18* (2013.01); *F16C 2226/12* (2013.01); *F16C 2226/52* (2013.01); *F16C 2326/02* (2013.01)

(58) Field of Classification Search
CPC ............. F16C 2226/12; F16C 2326/02; B60B 27/001; B60B 2380/14; B60B 2380/75; F16F 2223/18
USPC ....... 384/477, 484–486, 488, 504, 544, 561, 384/564, 565, 570–571, 586–589; 277/345, 353, 565, 590; 464/133
See application file for complete search history.

(56) References Cited

U.S. PATENT DOCUMENTS

| | | | | |
|---|---|---|---|---|
| 3,479,840 A * | 11/1969 | Meyers | ................ | F16C 21/005 277/349 |
| 3,531,168 A * | 9/1970 | Bainard | ............... | F16J 15/3276 277/565 |
| 3,554,566 A * | 1/1971 | Bainard | ............... | F16J 15/3224 277/561 |
| 3,716,280 A * | 2/1973 | Leibensperger et al. | ............................. | B23Q 1/265 384/448 |
| 4,337,628 A * | 7/1982 | Greene | ................. | F16C 21/005 277/373 |
| 4,419,901 A * | 12/1983 | Ruppert | ................... | F16C 19/28 73/862.49 |
| 4,787,758 A * | 11/1988 | Jacob | ...................... | F16C 19/26 29/898.062 |
| 4,806,026 A * | 2/1989 | Bauer | ................. | F16C 33/7809 277/353 |
| 5,080,502 A * | 1/1992 | Diedrich | ............. | B60B 33/0028 384/484 |
| 5,421,591 A * | 6/1995 | Katzensteiner | ...... | B60K 17/306 277/550 |
| 6,736,731 B2 * | 5/2004 | Schultze | ............. | F16C 33/7809 277/365 |
| 7,241,053 B2 * | 7/2007 | Sato | ...................... | D21G 1/0226 374/E13.01 |
| 7,465,100 B2 * | 12/2008 | Matsui | ................ | F16C 33/7809 277/549 |
| 8,186,885 B2 * | 5/2012 | Umekida | .............. | B60B 27/001 384/504 |
| 8,196,932 B2 * | 6/2012 | Kobayashi | .......... | F16C 33/7809 277/345 |
| 8,356,944 B2 * | 1/2013 | Fox | ....................... | F16C 19/548 29/898.09 |
| 8,740,464 B2 * | 6/2014 | Berns | ................. | F16C 33/7806 277/579 |

* cited by examiner

BEARING ASSEMBLY WITH PRELOAD

CROSS-REFERENCE

This application claims priority to German patent application no. 10 2015 220 962.8 filed on Oct. 27, 2015, the contents of which are fully incorporated herein by reference.

TECHNOLOGICAL FIELD

The present disclosure relates to a bearing assembly for a wheel bearing assembly of a vehicle with a seal assembly.

BACKGROUND

Bearing assemblies for wheel bearing assemblies are often embodied as tapered-roller-bearing assemblies. Here two cooperating tapered roller bearings are axially preloaded against each other and received on or in a hub. Furthermore, a seal assembly is provided that seals the bearing assembly against an entry of dirt and/or water, and/or against a discharge of lubricant. This seal assembly is usually embodied as a cassette seal and is applied as a complete component on the bearing assembly, in particular on the bearing rings.

Furthermore, the setting of the preload in tapered roller bearings is a relatively complex and also inexact process, wherein it is attempted to set the correct preload by displacing the two inner rings of a tapered roller bearing unit axially towards each other (in the case of a back-to-back bearing arrangement) or axially away from each other (in the case of a face-to-face bearing arrangement). The correct displacement path is determined by a complex measuring of the components and set by shims such that the desired preload arises. The preload is then maintained by tightening a shaft nut with which the entire bearing assembly is fixed to a shaft part.

Since the securing of the nut or the fixing of the inner rings is achieved via a corresponding clamping force, it must be taken into account here in turn that the bearing preload complexly set via shims is influenced by the usually very large clamping force. An exact desired preload can thus only be achieved with difficulty.

It has therefore been proposed, in particular in DE 10 2012 221 297, to dispose at least one of the flanges on the bearing ring such that it is adjustable in the axial direction relative to the bearing ring carrying it, wherein the adjustable flange includes a thread via which its axial position is adjustable.

However, the problem thereby arises that the cassette seal usually used can no longer be used, and must be adapted to the particular circumstance and preload. This is on the one hand expensive and on the other hand requires a very time-consuming installation.

SUMMARY

An aspect of the present disclosure is therefore to provide a bearing assembly wherein the preload on the bearing assembly can be simply and precisely set and that makes possible a simple installation of the seal assembly.

In the following a bearing assembly, in particular a wheel bearing assembly for a vehicle, with at least one rolling-element bearing, in particular with two tapered roller bearings, is presented, wherein the at least one rolling-element bearing includes a bearing outer ring and a bearing inner ring that define a bearing interior between them in which rolling elements are disposed. Furthermore, the bearing assembly includes a seal assembly for sealing the bearing assembly, wherein the seal assembly includes a carrier element that is connectable, for example, via an axially extending ring arm, to one of the bearing rings of the bearing assembly such that they rotate together, and includes a radially extending annular flange, wherein the radially extending flange carries a radially encircling seal with at least one seal lip. The seal lip in turn extends toward the other bearing ring and sealingly abuts on a sleeve-shaped element that is connectable to the other bearing ring of the bearing assembly such that they rotate together.

In order to provide both a simple installation but also, as further precisely explained below, a simple and precise preload in the bearing assembly, it is proposed to form the sleeve-shaped element as a preferably axially adjustable flange that forms an axial stop for the rolling elements. Thus the seal and the flange can be installed in a single work step. Moreover, in addition to the faster installation, a cost advantage can arise in that a metal-plate part for the seal and a metal-plate part for the flange need not be used, rather a single metal-plate part suffices.

According to an advantageous exemplary embodiment the sleeve-shaped element is adjustable in the axial direction relative to the associated bearing ring or disposed relative to the bearing ring. A defined preload force can thereby be applied onto the bearing assembly, and the bearing assembly simultaneously sealed against an entry of dirt and/or water.

According to a further advantageous exemplary embodiment, the sleeve-shaped element forming the flange is disposed with a press-fit on or relative to the bearing ring and displaceable on or relative to the bearing ring against a friction given by the press-fit. A simple installation of the axially displaceable flange can thereby be achieved since no thread need be provided on the sleeve-shaped element, rather it is simply disposed with press-fit on or relative to the bearing ring and is configured displaceable on or relative to the bearing ring against a friction given by the press-fit.

Moreover, if a preload is to be set via the sleeve-shaped element forming the flange, this is possible in a simple manner since the preload is achieved via the size of the friction force of the press-fit with the axial displacing of the sleeve-shaped element forming the displaceable flange. In addition, a separation of the two preload circuits, namely of the preload circuit of the roller preload and the preload circuit of the inner-ring clamping, can be achieved by the pushing-on under press-fit, which in turn causes the negative influence of an inner-ring clamping or a nut-locking to be able to be separated from the actual bearing preload. Furthermore, via the press-fit or the magnitude of the friction generated by the press-fit during displacing of the sleeve-shaped element forming the adjustable flange it can be precisely determined what force the rolling elements exert on the flange and thus what preload prevails in the bearing assembly. A defined preload on the bearing assembly can thereby be simply and quickly achieved. Here it is also possible to achieve different preloads via the use of different press-fits of the flange.

Furthermore, a great diversity of arrangement possibilities of the sleeve-shaped element forming the flange is advantageously achieved. Thus, for example, the sleeve-shaped element forming the adjustable flange can be disposed on the outer ring or inner ring or also on a bearing housing receiving the rolling-element bearing or on a shaft rotatably supported by the bearing.

In particular with the disposing on the bearing inner ring a seal can thus be provided that is designed more durable overall. The reason for this is that the sleeve element functioning as a flange has a smaller diameter than a bearing ring formed integrated with the flange, so that the rotational speed with which the seal lip runs along the sleeve-shaped element is reduced, and thus friction losses and wear are reduced.

According to a further advantageous exemplary embodiment, the inner ring or the outer ring includes a cylindrical seat onto which the sleeve-shaped element forming the flange is pushable-on, preferably under press-fit. Due to the cylindrical seat it can also be achieved that a constant friction force opposes the displaceability of the sleeve-shaped element forming the displaceable flange and thus a defined preload can be determined and generated.

Furthermore, it is advantageous if the sleeve-shaped element forming the flange is fixable on the bearing ring in an axially non-adjustable manner. The sleeve-shaped element can thereby be fixedly connected to the bearing ring. If the sleeve-shaped element is configured as an axially adjustable flange, then after the desired preload is generated the sleeve-shaped element can be axially secured in order to prevent slipping of the sleeve-shaped element forming the adjustable flange during operation of the bearing.

Here the sleeve-shaped element forming the flange can be connected to the bearing ring and/or the bearing housing in an interference-fit or materially-bonded manner, in particular by laser welding. Due to the interference-fit or materially-bonded connection the sleeve-shaped element can be very quickly and reliably connected to the bearing ring or the bearing housing. Here a preferably circumferentially disposed groove can also be provided on the bearing ring and/or the bearing housing, into which the sleeve-shaped element is rolled-up and/or connected with interference-fit to the sleeve-shaped element in another manner Moreover, if the sleeve-shaped element is configured slightly deformable at least in a partial region, in particular the region that interacts with the groove, then the sleeve-shaped element can be deformed in the region of the groove, for example, via hammering, whereby an interference fit arises. As already explained above this makes possible a simple interference-fit connection between the sleeve-shaped element and the bearing ring and/or the bearing housing.

According to a further advantageous exemplary embodiment the sleeve-shaped element forming the flange is configured at least partially hardened, in particular inductively hardened, wherein preferably an axial end region facing the rolling elements and/or a region contacting at least one seal lip is configured hardened. Since the sleeve-shaped region should preferably include a hard contact region for the roller guiding and for the abutment of the seal lip, but also a plastically deformable region for the fixing of the sleeve-shaped element on the bearing ring, an inductively hardened contact zone is favored in particular. A regionally precise hardening and a plastic deforming for an interference fit with the groove can thereby be provided.

Alternatively or additionally the sleeve-shaped element forming the flange at least partially includes, in particular on an outer surface, a wear-resistant coating. Here the axial end region facing the rolling elements and/or a region contacting the at least one seal lip preferably includes the wear-resistant coating. The wear-resistant coating can be, for example, a DLC (diamond-like carbon) layer, carbonitriding- and/or nitriding layer, but a ceramic layer, a hard-chromium layer, or another wear-resistance-promoting layer known in the prior art is also conceivable. Due to the wear-resistant coating, even with long operating durations premature signs of wear in the contact region of rolling elements or seal lips can be avoided, whereby the service life of the bearing can be increased.

A further aspect of the present disclosure relates to a method for setting a preload in a sealed rolling-element bearing, in particular a tapered roller bearing, wherein the rolling-element bearing includes two bearing rings that are configured as inner ring and outer ring and between which at least one rolling element is disposed. Furthermore, a seal assembly and an axially adjustable flange is disposed on the inner ring and/or on the outer ring, wherein the axially adjustable flange is formed by a sleeve-shaped element that simultaneously serves as contact sleeve for a seal lip of the seal assembly. The sleeve-shaped element is preferably disposed with a press-fit on or relative to the bearing ring and is displaceable on or relative to the bearing ring against a friction given by the press-fit. Here the method comprises the following steps:

disposing the sleeve-shaped element forming the flange on or relative to the bearing ring;

disposing the at least one rolling element on the inner ring;

introducing the inner ring with the at least one rolling element disposed thereon in the outer ring;

displacing the inner ring and/or the outer ring with respect to each other up to a stop of the at least one rolling element on the sleeve-shaped element;

displacing of the sleeve-shaped element on or relative to the bearing ring against the friction given by the press-fit by further displacing the inner ring and/or of the outer ring so that a predetermined preload is achieved in the tapered roller bearing;

fixing the sleeve-shaped element in the position that the sleeve-shaped element has assumed with reaching of the predetermined preload; and applying a seal carrier with an axially extending ring arm and a radially extending annular flange, which carries a radially encircling seal with at least one seal lip, on the bearing ring opposing the sleeve-shaped element such that the seal lip sealingly contacts the sleeve-shaped element.

It is preferred here in particular if this method for preloading and sealing is used with an above-described bearing assembly.

Further advantages and advantageous embodiments are defined in the description, the drawings, and the claims. Here in particular the combinations of features specified in the description and in the drawings are purely exemplary, so that the features can also be present individually or combined in other ways.

In the following the disclosure is described in more detail with reference to the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
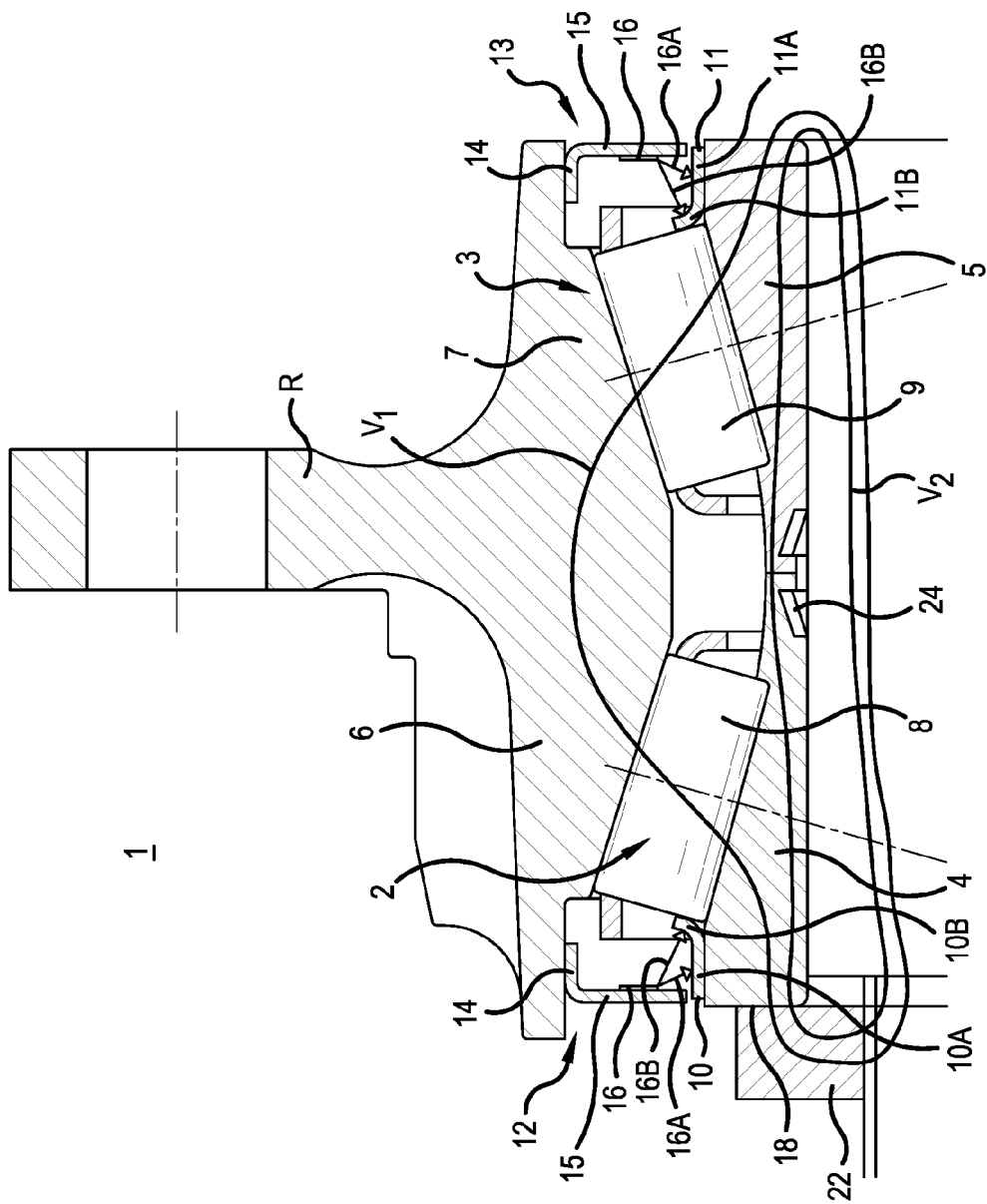
FIG. 1 is a schematic sectional view through a first exemplary embodiment of the disclosed bearing assembly.
Figure 2:
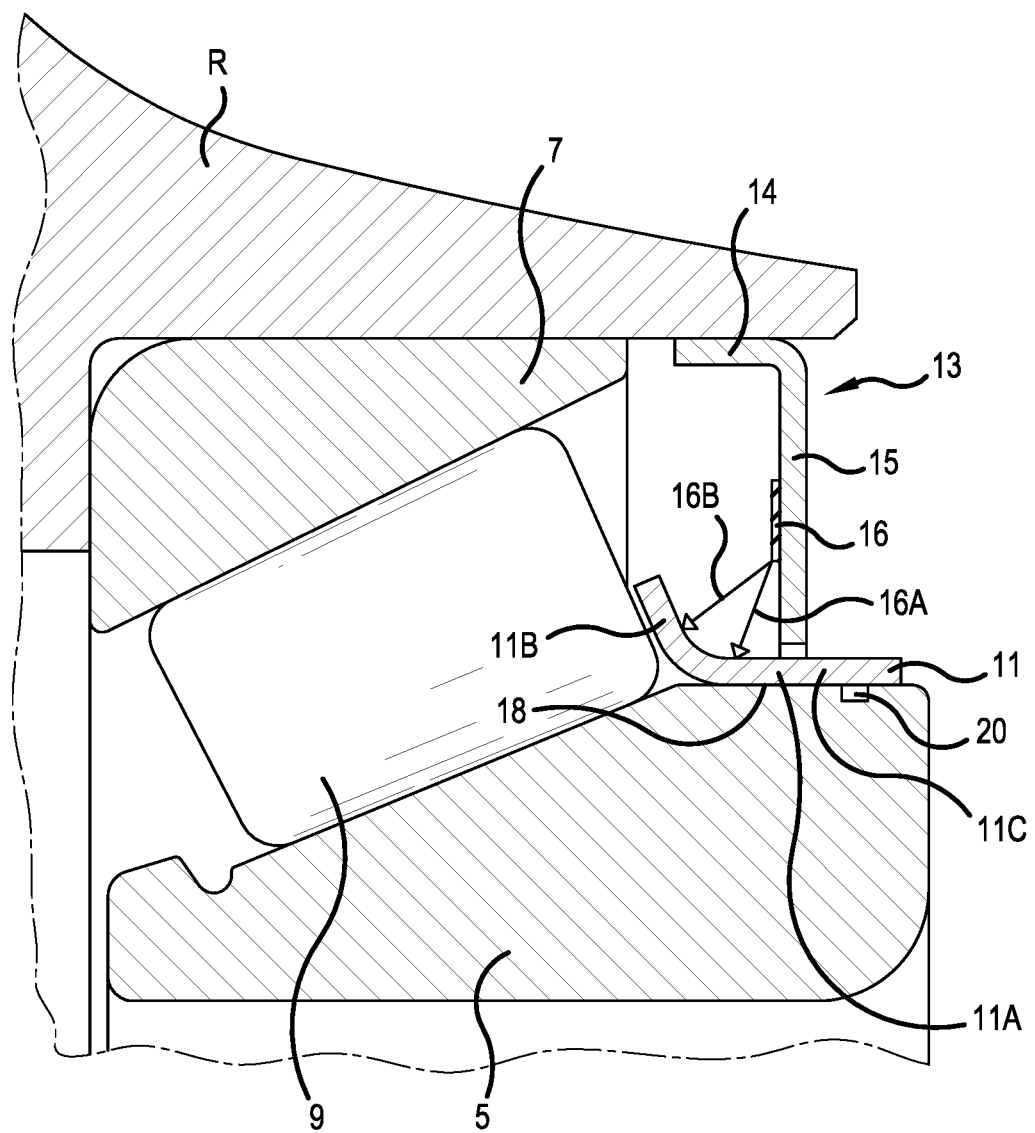
FIG. 2 is a detail view of the bearing assembly depicted in FIG. 1.

In FIG. 1 a bearing assembly 1 is depicted that includes two tapered roller bearings 2 and 3. The two tapered roller bearings 2, 3 each have an inner ring 4 or 5, but a common outer ring 6, or as depicted in FIG. 2 each have their own outer ring 6, 7. Rolling elements 8 or 9 are disposed between the bearing rings. Such bearing assemblies can be found in particular in wheel bearing units, wherein the bearing assemblies are fitted in a wheel hub R.

The bearing assembly depicted is embodied in a back-to-back arrangement. Flanges 10 and 11 on the inner rings 4, 5 limit the movability of the tapered rollers 8, 9 in the axial direction.

Here the flanges 10, 11 are configured as sleeve-shaped elements (flange sleeves), that are pushed-on onto the bearing rings 4, 5. While the sleeve-shaped element 11 of the inner ring 5 is fixed on the inner ring 5 as a fixed flange, this does not apply for the sleeve-shaped element 10 that forms the flange 10 on the inner ring 4. This sleeve-shaped element is embodied as an axially adjustable flange 10, i.e., it can also be adjusted in the axial direction on the inner ring 4 after the assembly of bearing rings and rolling elements.

Furthermore, it can be seen from FIG. 1 that the flange sleeves 10, 11 are simultaneously configured as contact sleeves for seal assemblies 12, 13. The seal assemblies 12, 13 are configured as cassette seals and include, as can also be seen in particular in the enlarged depiction from FIG. 2, an axially extending ring arm 14 and a radially extending annular flange 15. Furthermore, a seal lip 16 is attached on the radially extending flange 15, which seal lip 16 extends away from the axially extending ring arm 14 towards bearing inner ring 4, 5 and sealingly abuts on the flange sleeves 10, 11. Here the seal lip 16 can also be configured as a multi-part seal lip 16, which abuts with a first section 16-A on an axially extending section 10-A, 11-A of the flange sleeve 10, 11, and a second section 16-B on the section 10-B, 11-B of the flange sleeve 10, 11, which section 10-B, 11-B forms the flange.

Furthermore, FIG. 2 shows in particular that the flange sleeves 10, 11 are configured with press-fit to the inner ring 4. Here it is advantageous in particular if, as FIGS. 1 and 2 show, the inner ring 4 includes a cylindrical shoulder 18 on which the flange sleeve 10 is pushed-on under press-fit. Here during the assembly the sleeve-shaped element 11 forming the fixed flange is first pushed-on on the inner ring 5 under press-fit and fixed. This fixing can be effected via welding, in particular laser welding; however it is also possible to provide a groove 20 in the bearing inner rings 4, 5, into which groove 20 the flange sleeves 10, 11 are rolled up. It is also possible to deform the flange sleeves 10, 11 by hammer blows such that a clamping in the groove 20 occurs. In contrast, during installation, the sleeve-shaped element forming the axially adjustable flange 10 is axially displaced against the resistance of a friction between flange sleeve 10 and bearing ring 4 so that a predetermined preload can be generated in the bearing assembly.

The displacing of the sleeve-shaped element 10 forming the adjustable flange occurs here advantageously during the tightening of a shaft nut 22, via which the inner rings 4 and 5 are fixed against each other. During the tightening of the shaft nut 22, the rolling elements 8, 9 are pressed-on on the outer ring 6 via the inner rings 4, 5. Since the press-fit of the flange sleeve 10 is usually less than the force with which the shaft nut 22 displaces the inner rings 4, 5 into their end position, i.e., abutting each other, the flange sleeve 10 is displaced axially outward along the cylindrical shoulder 18. However, this displacing only occurs after overcoming of the counterforce generated by the friction, so that a preload is generated that is on the scale of the friction force. A predetermined preload can thereby be defined and determined.

At the same time the two preloads, namely the preload of the bearing assembly corresponding to the preload circuit V1 and the preload or clamping of the inner rings 4, 5 corresponding to the preload circuit V2 are separated from each other via the advancing of the shaft nut 22, so that even with a later inexact installation of the inner rings 4, 5 with respect to each other the predefined preload in the tapered roller bearing 1 itself remains.

If after advancing the shaft nut 22 the flange sleeve 10 is positioned in its end position on the cylindrical shoulder 18, the position of the flange sleeve 10 can be fixed, for example, using an interference fit or material bonding. It is thereby ensured that even in operation a further axial displacing or loosening of the flange sleeve 10 does not occur. For this purpose, as with the fixed flange sleeve 11 on the inner ring 4 a groove 20 can be incorporated that preferably extends circumferentially about the bearing ring 4. After achieving of the predetermined preload the flange sleeve 10 can then be rolled up into the groove 20 or deformed, for example, by hammer blows, such that a clamping of the flange sleeve 10 in the groove 20 occurs. Alternatively it is of course also possible to attach the flange sleeve 10 on the inner ring 4 in a materially-bonded manner, for example, by welding, in particular laser welding. The forming of the groove 20 can then be omitted.

In order to keep the wear on the flange sleeve 10, 11 as low as possible it is furthermore provided that the axial flange section 10-B, 11-B of the flange sleeve 10-11, which flange section 10-B, 11-B faces the rolling elements 8, is induction-hardened. In contrast, an axial end region 10-C, 11-C (see FIG. 2) that faces away from the rolling elements 8 is not hardened. The not-hardened region 10-C, 11-C of the flange sleeve 10, 11 can thereby be plastically deformed so that a deforming of material into the groove 20 is possible. It is also possible to harden the region 10-A, 11-A on which the seal lips 16-A, 16-B run. The wear in this region can thereby be reduced.

Alternatively or additionally it is possible to provide the axial flange section 10-B, 11-B facing the rolling elements 8 and/or the region 10-A, 11-B of the flange sleeves 10-11, which region 10-A, 11-B faces the seal lips, with a wear-resistant coating. Due to this coating particularly with long operating times premature signs of wear in a contact region between the flange sleeves 10, 11 and the rolling elements 8 or the seal lips 16-A, 16-B can be avoided.

Instead of disposing the flange sleeves 10, 11 on the inner ring 4, as is depicted in FIGS. 1 and 2, it is of course also possible to place the flange sleeves 10, 11 on the outer ring 6 or on a bearing housing R comprising the outer ring.

As already mentioned above the disclosed bearing assemblies are of advantage in particular in wheel bearing units wherein the tapered roller bearings are installed under a predetermined preload. Simultaneously the inner rings 4 and 5 must usually generally be brought into a tightly abutting position in order to dispose a clip ring 24 (see FIG. 1) between them and axially secure the two inner rings 4 and 5 with respect to each other in operation. In particular in the solutions with location rings known from the prior art this has led to the problem that in the assembly precisely defined positions of the shaft nut are necessary in order to generate a defined preload. However, since this is very complicated in terms of assembly, to date a predetermined preload has usually been omitted.

If the tapered roller bearings are also to be sealed against an external environment, it has been shown that the use of standardized cassette seals with axially adjustable flanges was often not to be realized. In particular in solutions with axially adjustable flange sleeves the seals must be specially manufactured. Due to the above-described use of the flange sleeve as seal-lip contact and rolling-element support a standardized solution can thus be provided that can also be used with axially adjustable flange sleeves. However, sealed bearings with fixed flange sleeves can also be equipped with flange sleeves, which are simultaneously configured as contact sleeves for the seal lips of the seal assembly. If the seals are not introduced as a complete assembly set, it can be advantageous to design the seal carrier such that the axial ring section is disposed on the bearing inner side and the radial flange section is disposed on the bearing outer side. The seal carrier can thereby be simply pushed-on into the bearing assembly and in particular onto the flange sleeve.

In addition to a wear-reducing coating or hardening, the service life of the seal assembly and thus of the bearing assembly can also be increased by the rotational speed of the seal lips on the flange sleeve being lower than with an abutment of the seal lips on a bearing inner ring with a flange configured in an integrated manner. The reason for this is that the outer diameter in a bearing inner ring with integrated flange corresponds to the bearing-ring thickness+the flange height. A diameter reduction due to the cylindrical shoulder 18 is omitted. However, the rotational speed of the seal lips also thereby decreases, which leads to the increased service life.

It is further noted that rolling-element bearings other than the tapered roller bearing depicted can also include a flange sleeve that simultaneously serves as contact sleeve for the seal lips of a seal assembly.

Overall with the above-described bearing assembly a sealed bearing assembly can be provided that synergistically uses one element whereby on the one hand costs are saved and on the other hand installation steps can be simplified. At the same time with axially adjustable flanges using which a predetermined precise preload is achieved in the bearing a standardizable and easy-to-install solution for a seal is also provided.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Rolling-element bearing
3 Rolling-element bearing
4 Inner ring
5 Inner ring
6 Outer ring
7 Outer ring
8 Rolling element
9 Rolling element
10 Adjustable flange sleeve
11 Fixed flange sleeve
12, 13 Seal assembly
14 Axial ring section
15 Radial flange
16 Seal lip
18 Cylindrical seat
20 Groove
22 Shaft nut
24 Clip ring
V1 Preload circuit
V2 Preload circuit
R Hub

What is claimed is:
1. A wheel bearing assembly for a vehicle comprising:
at least one rolling-element bearing having a first bearing ring and a second bearing ring defining therebetween a bearing interior;
rolling elements disposed in the interior; and
a seal assembly for sealing the bearing assembly,
wherein the seal assembly comprises a sleeve-shaped element connected to the second bearing ring such that the sleeve-shaped element rotates with the second bearing, the sleeve-shaped element comprising an axially extending cylindrical portion mounted on a radially facing surface of the second bearing ring, an axial end of the cylindrical portion being bent radially to form a flange that forms an axial stop for the rolling elements, and a carrier element connected to the first bearing ring such the carrier element rotates with the first bearing ring, the carrier element including a radially extending annular flange,
wherein the radially extending annular flange supports a radially encircling seal having at least one seal lip, the seal lip extending toward the second bearing ring and sealingly abutting on the sleeve shaped element.
2. The wheel bearing assembly according to claim 1, wherein the at least one rolling-element bearing comprises a first rolling element bearing and a second rolling element bearing.
3. The wheel bearing assembly according to claim 1, wherein the sleeve-shaped element is press-fit on the second bearing ring and is displaceable relative to the second bearing ring by overcoming a friction of the press fit.

4. The wheel bearing assembly according to claim 1, wherein the second bearing ring comprises an inner bearing ring.

5. The wheel bearing assembly according to claim 1, wherein the sleeve-shaped element is disposed on a component receiving or supporting the rolling-element bearing.

6. The wheel bearing assembly according to claim 1, wherein the second bearing ring includes a cylindrical seat onto which the sleeve-shaped element is pushable-on under press-fit.

7. The wheel bearing assembly according to claim 1, wherein the sleeve-shaped element is axially fixed in a non-adjustable manner on the second bearing ring.

8. The wheel bearing assembly according to claim 7, wherein the sleeve-shaped element is connected to the second bearing ring in an interference-fit or materially-bonded manner.

9. The wheel bearing assembly according to claim 7, wherein the second bearing ring includes a circumferential groove into which the sleeve-shaped element is deformed.

10. The wheel bearing assembly according to claim 9, wherein the sleeve-shaped element forming the flange is inductively hardened at an axial end region facing the rolling elements.

11. The wheel bearing assembly according to claim 1, wherein the sleeve-shaped element includes a wear-resistant coating on a surface on an axial end region facing the rolling elements and/or on a region contacting the at least one seal lip.

12. The wheel bearing assembly according to claim 1, wherein the at least one seal lip comprises a first seal lip and a second seal lip and wherein the first seal lip sealingly abuts on the annular flange.

13. The wheel bearing assembly according to claim 1, wherein the sleeve-shaped element is axially adjustable relative to the second bearing ring.

14. A wheel bearing assembly for a vehicle, comprising:
at least one rolling-element bearing having a first bearing ring and a second bearing ring defining therebetween a bearing interior;
rolling elements disposed in the interior; and
a seal assembly for sealing the bearing assembly,
wherein the seal assembly comprises a sleeve-shaped element connected to the second bearing ring such that the sleeve-shaped element rotates with the second bearing, the sleeve-shaped element comprising a flange that forms an axial stop for the rolling elements, and a carrier element connected to the first bearing ring such the carrier element rotates with the first bearing ring, the carrier element including a radially extending annular flange,
wherein the radially extending annular flange supports a radially encircling seal having at least one seal lip, the seal lip extending toward the second bearing ring and sealingly abutting on the sleeve shaped element,
wherein the at least one rolling-element bearing comprises a first rolling element bearing and a second rolling element bearing, and
wherein the sleeve-shaped element is axially adjustable relative to the second bearing ring.

15. The wheel bearing assembly according to claim 14, wherein the first and second rolling-element bearings are preloadable in an axial direction by relatively displacing the first bearing rings and/or the second rings.

16. The wheel bearing assembly according to claim 15, including a nut preloading the first and second rolling-element bearings.

17. A wheel bearing assembly for a vehicle comprising:
a first bearing ring and a second bearing ring defining therebetween a bearing interior, the second bearing ring having a first part defining a first raceway and a second part defining a second raceway axially adjacent to the first raceway, the first part meeting the second part at a joint;
a first plurality of rolling elements disposed between the first bearing ring and the first raceway and a second plurality of rolling elements disposed between the first bearing ring and the second raceway; and
a seal assembly sealing the interior;
wherein the seal assembly comprises a sleeve connected to the first part of the second bearing ring by a press fit such that the sleeve rotates with the second bearing ring, the sleeve including a flange that forms an axial stop for the plurality of rolling elements, and a carrier element connected to the first bearing ring such the carrier element rotates with the first bearing ring, the carrier element including a radially extending annular flange,
wherein the radially extending annular flange supports a radially encircling seal having at least one seal lip, the seal lip extending toward the second bearing ring and sealingly abutting on the sleeve, and
wherein a bearing preload is determined by a force of the press-fit.

18. The wheel bearing assembly according to claim 17, wherein the sleeve comprises an axially extending cylindrical portion mounted on a radially facing surface of the second bearing ring, an axial end of the cylindrical portion being bent radially to form the flange.

19. The wheel bearing assembly according to claim 17, wherein the sleeve is configured to slide axially on the first part when the given force exceeds the force of the press-fit.

20. The wheel bearing assembly according to claim 17, further including a nut for pressing the first part against the second part to increase the preload.

* * * * *